United States Patent
Laakkonen et al.

(10) Patent No.: US 9,005,036 B2
(45) Date of Patent: Apr. 14, 2015

(54) SYSTEM AND METHOD FOR SHARING GAMEPLAY EXPERIENCES

(71) Applicant: Applifier Oy, Helsinki (FI)

(72) Inventors: Jussi Laakkonen, Vantaa (FI); Olli Sinerma, Espoo (FI)

(73) Assignee: Applifier Oy, Helsinki (FI)

( * ) Notice: Subject to any disclaimer, the term of this patent is extended or adjusted under 35 U.S.C. 154(b) by 0 days.

(21) Appl. No.: 13/690,906

(22) Filed: Nov. 30, 2012

(65) Prior Publication Data

US 2014/0155171 A1 Jun. 5, 2014

(51) Int. Cl.
*A63F 13/00* (2014.01)
*G07F 17/32* (2006.01)
*A63F 13/30* (2014.01)

(52) U.S. Cl.
CPC ............ *G07F 17/3225* (2013.01); *A63F 13/12* (2013.01); *A63F 2300/538* (2013.01); *A63F 2300/577* (2013.01); *G07F 17/3272* (2013.01)

(58) Field of Classification Search
CPC ... A63F 13/10; A63F 13/12; A63F 2300/577; A63F 2300/6018; A63F 13/06; A63F 2300/538; A63F 2300/61; A63F 2300/308
USPC ................................. 463/40–43; 700/91–92
See application file for complete search history.

(56) References Cited

U.S. PATENT DOCUMENTS

| | | | |
|---|---|---|---|
| 5,410,698 A | 4/1995 | Danneels et al. | |
| 5,699,275 A | 12/1997 | Beasley et al. | |
| 6,405,171 B1 | 6/2002 | Kelley | |
| 7,171,674 B2 | 1/2007 | Arrouye et al. | |
| 7,801,931 B2 | 9/2010 | Tunar et al. | |
| 2007/0060359 A1* | 3/2007 | Smith | 463/42 |
| 2008/0139301 A1* | 6/2008 | Holthe | 463/25 |
| 2009/0131177 A1* | 5/2009 | Pearce | 463/43 |
| 2009/0258708 A1* | 10/2009 | Figueroa | 463/43 |
| 2009/0305790 A1* | 12/2009 | Lu et al. | 463/42 |
| 2010/0144444 A1* | 6/2010 | Graham | 463/42 |
| 2011/0107220 A1* | 5/2011 | Perlman | 715/720 |
| 2011/0230246 A1* | 9/2011 | Brook et al. | 463/9 |
| 2012/0083331 A1* | 4/2012 | Carpenter et al. | 463/25 |

FOREIGN PATENT DOCUMENTS

WO 2013006226 A1 1/2013

OTHER PUBLICATIONS

"Intel IPP-Open Source Computer Vision Library"; Intel Software; Intel IPP-Open Source Computer Vision Library (OpenCV) FAQ | Intel Developer Zone; Mar. 25, 2012.

* cited by examiner

*Primary Examiner* — Justin Myhr
(74) *Attorney, Agent, or Firm* — Ziegler IP Law Group, LLC (57) ABSTRACT

Users are arranged to employ gameplay terminals which including computing hardware for executing one or more software products The users share gameplay experiences by including in the one or more software products a host game software application for implementing one or more games on one or more of the terminals, and appending one or more software components to the host game software application for providing control of the host game software application on a real-time basis for recording gameplay experiences for sharing amongst the users based upon one or more of: game view, sub-game view, sensor data employed to control the game, video camera views of one or more users playing the game, game events occurring during playing the game. A software development kit is also described.

20 Claims, 7 Drawing Sheets

SYSTEM AND METHOD FOR SHARING GAMEPLAY EXPERIENCES

FIELD OF THE INVENTION

The present invention relates to systems for sharing gameplay experiences. Moreover, the present invention also relates to methods of software and operating system for enabling gameplay experiences to be shared. Furthermore, the present invention relates to software development tools, for example a software development kit (SDK), for developing software products recorded on machine-readable data storage media, wherein the software products are executable upon computing hardware for implementing aforesaid methods.

BACKGROUND OF THE INVENTION

It is has been appreciated for a long time that sharing game-playing experiences, namely "gameplay experiences", with people within a social environment can be beneficial, for example as occurs for contemporary spectator sports such as football, cricket and similar. It has similarly also been appreciated that sharing gameplay experiences based on electronic games can also be beneficial for a group of people in mutual communication via an electronic communication network. However, it has been difficult to provide an optimal form of gameplay experience electronically on account of a lack of compatible user software, such that electronic user gameplay experiences have so far been disappointing.

Figure 1:
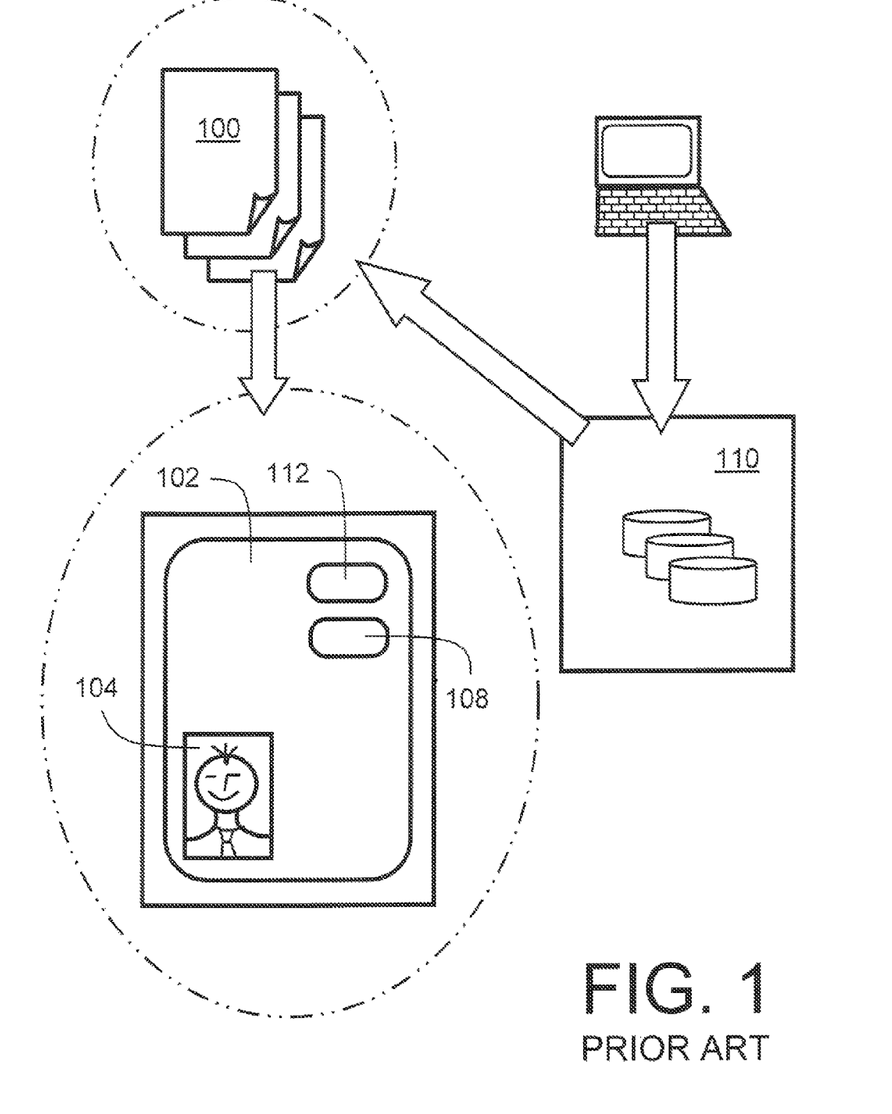
FIG. 1 is an illustration of a known gameplay experience sharing service.

For example, contemporary sharing of gameplay experiences can occur via services provided via the Internet, for example as provided via an service called Twitch offer by Justin.tv Inc located in San Francisco, Calif., USA. Referring to FIG. 1, an example known service offers gamers an opportunity to share their live gameplay via the Internet as one or more web pages 100. A game that is being played is presented on a screen 102 as a form of video presentation. The video presentation beneficially includes a video of a given player 104 whilst he/she is playing the game. The game and the video of the given player 104 are generated at a sending end, for example wherein the sending end is implemented using a personal computer (PC) or lap-top, and wherein the video is captured via a web-camera coupled to the aforesaid PC or lap-top, to a plurality of spectators; when viewed by the plurality of spectators, the game appears on their screens together with an overlaid window including a video image of the given player 104. The service in FIG. 1 is beneficially implemented by way of the given player 104 having a software product installed on his/her PC or lap-top that streams the video of the given player 104 to a server 110 from which the game and the video of the given player 104 are thereafter streamed to the plurality of spectators. Beneficially, the service includes social network components such as a "share" button 112, a "real-time chat" button 108, and so forth. Moreover, the service is also operable to record playing performances of the given player 104, as well as providing comparisons of performance of other users of the service. The service is beneficially funded via advertising, wherein the plurality of spectators are presented various advertisements intermingled with streaming of the given player 104 executing gameplay using the service.

A problem encountered with the service of FIG. 1 is that the plurality of spectators are obliged to view the gameplay experience of the given player 104 as streamed from the server 110. However, for a first sub-set of the spectators, certain portions of the streamed gameplay experience may not be of interest to them, for example the sub-set of spectators are busy people and are merely interested in experiencing performance highlights of the given user 104. Moreover, a second sub-set of the spectators may be desirous to experience the gameplay of the given player 104 in a different format to that which is contemporarily streamed from the server 110. Additionally game sharing can be done only if a player installs special recording software in the computer thus limiting amount of person having capability to share the game experience. Additionally in a solutions where the game sharing is integrated to playback can be done only in a game engine of the same game not as a video.

SUMMARY OF THE INVENTION

An object of the present invention is to provide to provide a system for sharing gameplay experiences in a reconfigurable manner.

Moreover, another object of the present invention is to provide a method of sharing gameplay experiences via communication networks and computing hardware operable to execute software products recorded on machine-readable data storage media.

Furthermore, another object of the invention is to provide software development kits (SDK) for developing software products for implementing aforesaid methods.

According to a first aspect of the present invention, there is provided a system for sharing gameplay experiences as claimed in claim 1: there is provided a system for sharing gameplay experiences between users, wherein the system includes gameplay terminals which the users employ for gameplay activities, wherein the gameplay terminals include computing hardware for executing one or more software products recorded on machine-readable data storage media, wherein the one or more software products include a host game software application for implementing one or more games on one or more of the terminals, and one or more software components for appending to the host game software application for providing control of the host game software application on a real-time basis for recording gameplay experiences for sharing amongst the users based upon one or more of: game view, sub-game view, sensor data employed to control the game, video camera views of one or more users playing the game, game events occurring during playing the game.

The invention is of advantage in that the one or more software components enable standard games to be adapted to be capable of providing gameplay sharing functionality which is individually reconfigurable for spectator users.

Optionally, in the system, the one or more software components are operable to cause the gameplay terminals to communicate the gameplay experiences via a communication network to a gameplay sharing experience service server arrangement through which the gameplay sharing experience is communicated from an originating gameplay terminal to one or more recipient gameplay terminals.

More optionally, in the system, the gameplay terminals are implemented as wireless-enabled computing devices including one or more of: smart telephones, laptop computer, personal computers, Pad computers, dedicated game playing terminals.

Optionally, in the system, the one or more software components are implemented as a software development kit (SDK) which includes a library of the software components.

Optionally, in the system, the one or more software components are operable to enable separate individual streams to be recorded pertaining to one of more of: UserFace Video, Game Video, Mix Sound, Game Sound, Game Control, Game Stat statistics, User Interface (UI) Data, Game Events.

More optionally, in the system, one or more software components are implemented as a downloadable application software library. More optionally, in the system, one or more software components are implemented via an OpenGL API.

Optionally, in the system, the one or more software components are operable to enable the gameplay experience when replayed at one or more of the terminals to be user-configurable by selecting amongst one or more streams of recorded elements stored in data memory when the gameplay experience was recorded prior to distribution within the system.

According to a second aspect of the invention, there is provided a software development kit (SDK) recorded on machine-readable data storage media, wherein the software development kit includes a library comprising one or more software components which are susceptible to being incorporated into host game software for implementing a system pursuant to the first aspect of the invention.

According to a third aspect of the invention, there is provided a method of sharing gameplay experiences between users included in a system, wherein the users are arranged to employ gameplay terminals which including computing hardware for executing one or more software products recorded on machine-readable data storage media, wherein the method includes:
(a) including in the one or more software products a host game software application for implementing one or more games on one or more of the terminals; and
(b) appending one or more software components to the host game software application for providing control of the host game software application on a real-time basis for recording gameplay experiences for sharing amongst the users based upon one or more of: game view, sub-game view, sensor data employed to control the game, video camera views of one or more users playing the game, game events occurring during playing the game.

Optionally, the method includes arranging for the one or more software components to be operable to cause the gameplay terminals to communicate the gameplay experiences via a communication network to a gameplay sharing experience service server arrangement through which the gameplay sharing experience is communicated from an originating gameplay terminal to one or more recipient gameplay terminals.

More optionally, in the method, the gameplay terminals are implemented as wireless-enabled computing devices including one or more of: smart telephones, laptop computer, personal computers, Pad computers, dedicated game playing terminals.

Optionally, in the method, the one or more software components are implemented as a software development kit (SDK) which includes a library of the components.

Optionally, in the method, the one or more software components are operable to enable separate individual streams to be recorded pertaining to one of more of: UserFace Video, Game Video, Mix Sound, Game Sound, Game Control, Game Stat statistics, User Interface (UI) Data, Game Events.

Optionally, in the method, one or more software components are implemented as a downloadable application software library. More optionally, in the method, one or more software components are implemented via an OpenGL API.

Optionally, in the method, the one or more software components are operable to enable the gameplay experience when replayed at one or more of the terminals to be user-configurable by selecting amongst one or more streams of recorded elements stored in data memory when the gameplay experience was recorded prior to distribution within the system.

According to a fourth aspect of the invention, there is provided a software product (GESW) recorded on machine-readable data storage media, wherein the software product is executable upon computing hardware for implementing a method pursuant to the third aspect of the invention.

It will be appreciated that features of the invention are susceptible to being combined in various combinations without departing from the scope of the invention as defined by the appended claims.

DESCRIPTION OF THE DIAGRAMS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

In overview, the aspects of the present disclosure are concerned with a software development kit (SDK) which enables software developers to embed within games software one or more software products which provide for recording, sharing and replaying gameplay experiences via a software module, referred to as "GESW" module, in a reconfigurable manner to suit individual user viewing preferences. The GESW module is beneficially configurable to record a given game as one stream and a camera view of a given player of the given game as another stream, wherein the camera view is of a front or rear of the given player, and wherein the camera view is captured by a device such as a camera-equipped smart phone; beneficially the camera-equipped smart phone has a touch screen for the given player to enter gameplay instructions. Moreover, the smart phone beneficially includes accelerometers and movement sensors for sensing actions of the given player. The smart phone is additionally operable to send recorded gameplay actions of the given player to a remote server, for example via a wireless communication network and/or via the Internet. The recorded gameplay actions can be distributed from the server to one or more spectators, for example within a social media environment. Moreover, the GESW module, which is embedded into games software, enables games users to replay other games users' experiences pertaining to one or more games. Furthermore, the GESW module is beneficially implemented as a software application interface (API) for displaying gameplay experiences to a given user at suitable times without the given user having to leave a given game to use a third-party supplied software product to watch such gameplay experiences.

A "mobile telephone" in Europe refers to a "cell phone" in the USA, wherein a smart phone is an advanced form of cell phone with considerable computing power and an advanced graphical user interface.

By including the software development kits (SDK) as a part of a gameplay experience, a given software developer can provide a user with a seamless, easy-to-use experience for recording, sharing and replaying gameplay experiences. Moreover, the SDK can enable the user to control which elements of the gameplay are shared by adding, changing or removing recorded contents, namely providing a form of editing function, thereby enabling only a certain portion of recorded gameplay experiences to the replayed to other users, or by annotating such gameplay experiences with text, audio or video recordings or graphical elements such as drawings to make them more interesting or entertaining to other users.

Figure 2:
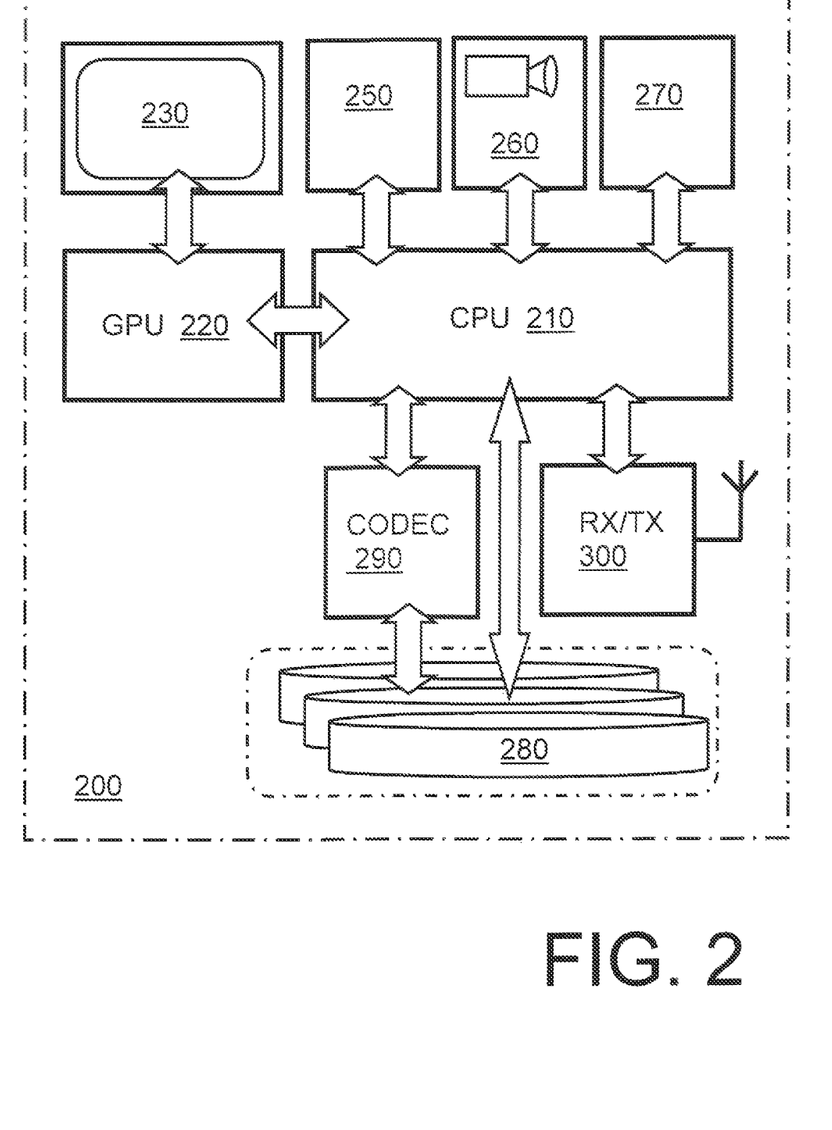
FIG. 2 is an illustration of a device for use in generating or replaying a gameplay experience pursuant to the present invention.

Referring next to FIG. 2, there is shown a general architecture of a portable wireless-enabled computing device 200, for example a tablet computer, smart telephone or similar. The device 200 includes a central processing unit (CPU) 210, which is operable to execute games software. Moreover, a graphics processor unit (GPU) 220 is coupled to the central processing unit (CPU) 210, and is operable to handle graphics associated with a game provided via executing of the games software. A display 230 is coupled to the graphics processor unit (GPU) 220 and is operable to provide a graphical representation of the game to a given user of the device 200. The device 200 further includes a touch input sensor 250, a camera 260, and other sensors 270 which are coupled to the central processor unit (CPU) 220 to provide sensor signals thereto. Additionally, the device 200 includes a data memory 280 provided with a hardware-based encoder/decoder (CODEC) 290, and finally a wireless interface (RX/TX) 300.

The device 200 is operable to execute a GESW software product on its central processor unit 210, wherein "GESW" is an abbreviation for "game experience recording software". In practice, the GESW software product includes a library of software components. A developer of game software is capable of using the library of software components as an integral part of a software game being developed or amended, namely game software together with one or more software components from the library are, on completion, compiled into a monolithic piece of software for distribution to users; there is thereby provided a host application which includes integrally therein recording, sharing and playback functionalities. The host application, namely a game when executed upon computing hardware, is arranged to be executed upon the aforesaid central processor unit 210.

The GESW software product provides technical effect, when executed, to capture, namely to take a "snap shot", of information content in the graphics processor unit (GPU) 220 in cooperation with the central processor unit 210, namely to capture images as presented in the display 230, namely screenshots. Optionally, the captured images are sent to the encoder/decoder 290 to compress the captured images and to create a game video which is stored in the data memory 280. Beneficial, the game software can control the API to capture images to the game video that differ from the image presented on the display 230; for example, to enhance a viewing experience of other users sharing the gameplay experience, certain graphic elements presented on the display 230 are excluded from the game video, for example various user control options which are only of interest to a user actually playing the game, but not of interest to spectators.

When the device 200 includes its camera 260 on a front side thereof together within the display 230, images captured by the camera 260, when the user plays the game on the device 200, are sent via the encoder/decoder 290 to the data memory 280; optionally, the images captured by the camera 260 are also shown to the user, for example in a miniature thumbnail window of the display 230, whilst the user is playing the game on the device 200. When the device 200 is a relatively older model with only a camera on its rear surface, the game can be played by the user in front of a mirror, such that the user can play the game whilst the rear camera is capturing a view of the user reflected in the mirror, wherein the signal provided from the rear camera is optionally subject to a mirror-image transform before being recorded in the data memory 280.

Optionally, the games software is capable of also configuring the GESW to record gestures, namely user interface data (UI data) entered via a touch screen 251 when employed for implementing the display 230, as well as via the other sensors 270, for example one or more of: accelerometers, magnetometers, location sensors, temperature sensors, and so forth. Moreover, the game software is also capable of configuring the GESW to record sound from a microphone of the device 200, for example cries of exhortation and exhilaration. Furthermore, the GESW is also capable of configuring the games software to record in one or more separate audio streams sounds generated when the game is played, for example impact noise, explosions, beeps and such like; the audio stream is beneficially also stored in the data memory 280 as game sound.

The GESW can also be configured to record special events, for example exciting events, for example attaining a high score, successfully completing a task in the game, user's "death" in the game or other events, namely "game events", occurring resulting from the user's interaction with the game presented on the device 200, as well as game statistics, namely "game stats". Additionally, the game software can use the API to add, change, remove and annotate the "game events" in real time according to the user's gameplay experience, for example to provide a personalized congratulatory message in the one or more streams being recorded in the data memory 280, such editing via the API enables the user, in a friendly manner, to edit and/or select which parts of the game video the user wants to share with other parties, namely spectators; for example, the user can select merely to include highlights of a game in the one or more streams recorded in the data memory 280.

Information recorded in the data memory 280 can thus include items as provided in Table 1. All these items are data linked via time stamps such that they can be replayed together in a temporally synchronized manner. Beneficially, all selection and management of recorded data in the data memory 280 arising from playing the game on the device 200 is handled by the aforesaid GESW library components.

TABLE 1 items that are recorded in the data memory 280
during playing of a game on the device 200.

| Item | Detail |
| --- | --- |
| UserFace Video | Video stream of the user's face when playing the game on the device 200 |
| Game Video | Video stream of game display as presented on the display 230 to the user |
| Mix Sound | Sounds which the user has selected to be added to the gameplay experience when present to other users via the server 110 ("Experience Server") |
| Game Sound | Sounds which accompanying playing the game, for example explosions, whooshes, beeps, cries, impact sounds |
| Game Control | Settings and other control parameters pertaining to the game which are controlled by the user |
| Game Stat | Statistics pertaining to the game being played on the device, for example scores, player performance parameters |
| UI Data | Data pertaining to inputs applied by the user to the device 200 when playing the game |
| Game Events | Special events occurring in the game, for example scoring a goal, "killing" an adversary, demolishing a fantasy castle and so forth |

Beneficially, the wireless interface (RX/TX) 300 is operable to communicate via Wifi or cellular telephone networks, for example 3G- or 4G-enabled networks, to other users for sharing gameplay experiences of the user.

Figure 3:
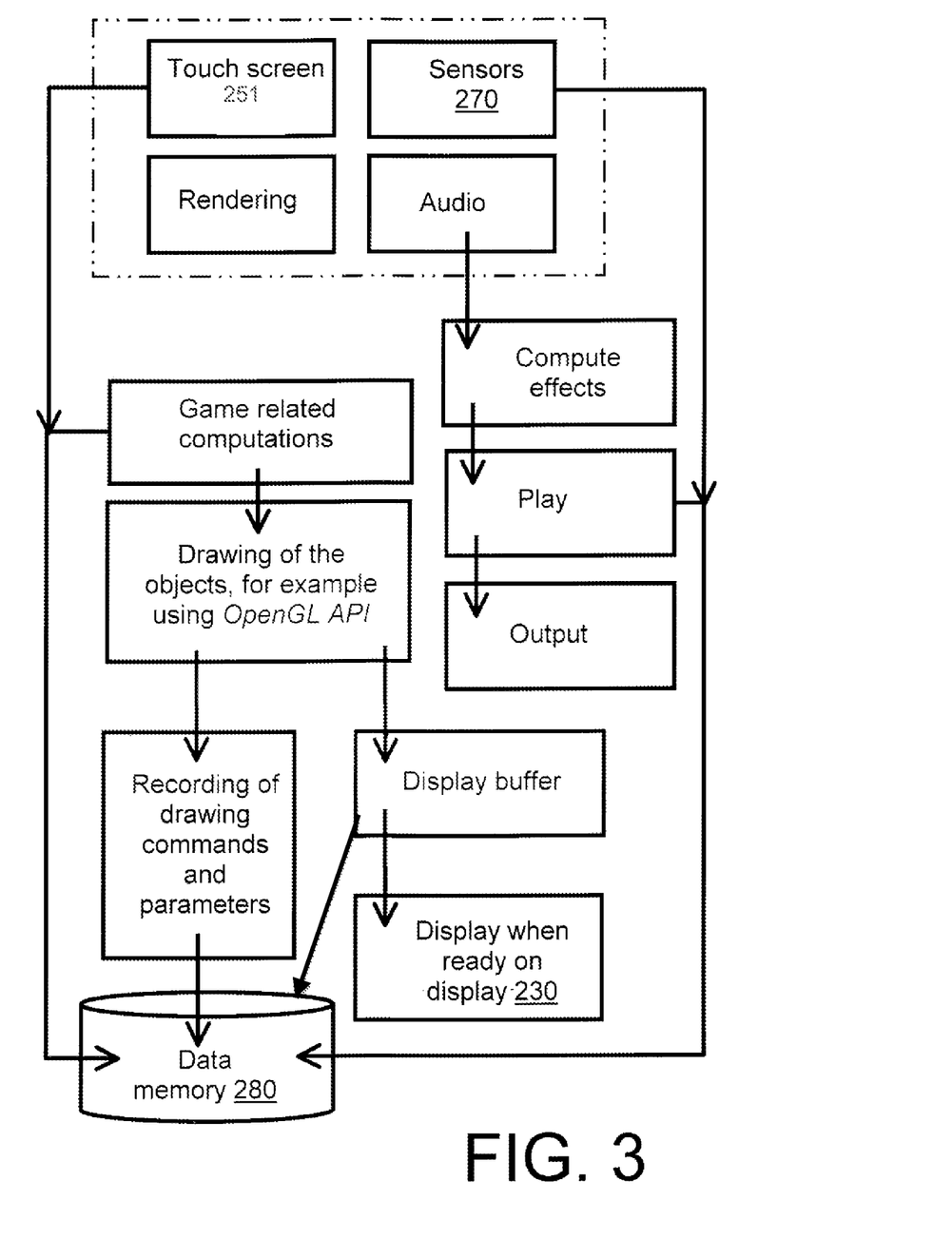
FIG. 3 is an illustration of a process for capturing graphics elements as employed in embodiments of the present invention.

Referring next to FIG. 3, there is shown examples of some features of the present invention. The game software has two principal output-related functions, namely providing a game view on the display 230 and generating associated audio. The game utilizes a game engine which computes how different objects of the game are to be positioned in the game relative to a coordinate system employed by the game engine, for example a notional Cartesian area or volume in which the game is to be accommodated. Moreover, the game engine computes how the different objects should appear on the coordinate system, and thereby creates a visual representation of the objects of the game, for example using a contemporary OpenGL API software application, to interface with the graphics processor unit (GPU) 220. This visual display is stored in a display buffer of the device 200 for presentation on the display 230. Moreover, the rendering engine continues to add visual elements to this display buffer until an entire graphics scene is completed, after which the display buffer is used to display corresponding information on the display 230 of the device 200 for the benefit of the user playing the game. The display buffer can be stored to the Data Memory 280 at the request of the game engine by using the GESW SDK.

In an alternative embodiment, the game engine sends commands to a graphics processor for generating drawings of objects for presentation when playing the game on the device 200. Such commands are beneficially sent using the aforementioned OpenGL API software application, to the graphics processor unit (GPU) 220, and are stored in the data memory 280. Selection of which commands are stored in the data memory 280 is configured from the GESW API; thus, a figure to be drawn for presentation on the display 230 is based on instructions sent from the game engine. Optionally, the drawing commands and associated parameters are stored in parallel to the data memory 280 of the device 200. In alternative embodiment game is rendered in OpenGL and either the frame buffer and/or commands are stored in the data memory 280. In some embodiments there can be two modes of recording: 1) a snapshot of the display buffer as captured as it is being drawn (either fully complete, or e.g. without some graphical elements completely drawn) or 2) OpenGL commands are captured and rerun later for capturing the snapshots of the display buffer.

Beneficially, audio information generated during playing of the game is captured from the central processing unit (CPU) 210 or dedicated audio chip and stored in the data memory 280 concurrently when the CPU 210 is playing the audio during playing of the game.

Figure 4:
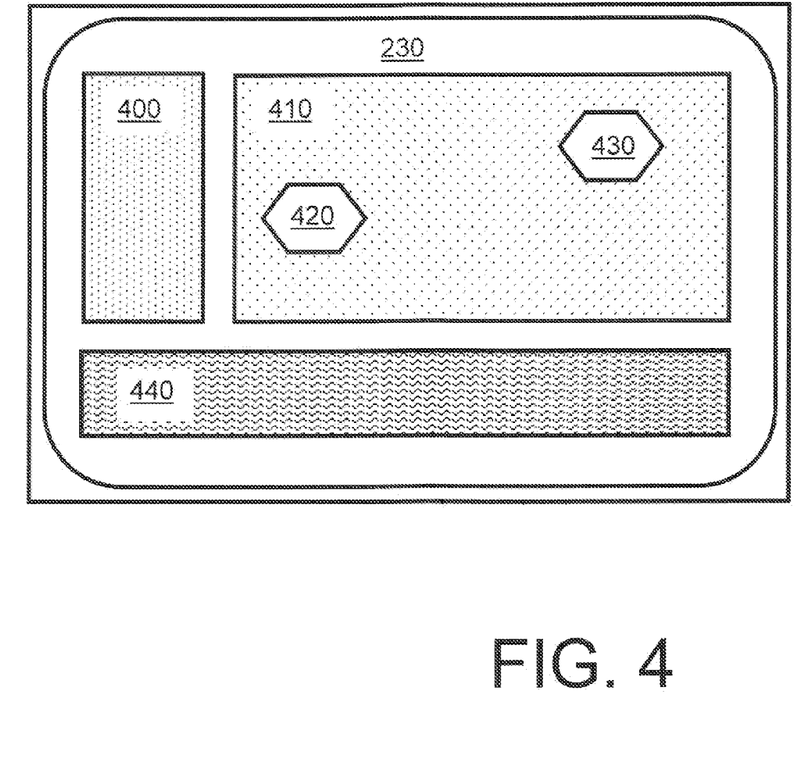
FIG. 4 is an illustration of display elements which are presented to a given user when executing gameplay on the device of FIG. 2.

The GESW API provides a games developer with an opportunity to choose which of the games elements, namely as provided in Table 1, are to be recorded in the data memory 280 for sharing later with other users, namely to provide a reconfigurable functionality. Moreover, the GESW API allows the developer, under program control, to add, remove and change elements of the gameplay recording in the data memory 280 in real time as the user plays the game on the device 200, for example for including personalized annotations, markings of certain segments of gameplay with metadata that can be used to guide further actions, for example searching for gameplay experiences, highlighting interesting segments, and so forth. Moreover, the GESW API also enables the developer to specify different streams generated during playing of a game on the device 200 to be recorded as mutually independent streams in the data memory 280; for example, it is possible to record an actual game view as an example Game Video stream, and for example a toolbar view as another Game Video stream, for example for viewing as a third video stream. Moreover, the GESW API can also be configured to allow recording of the streams into the data memory 280 in such a manner that only some objects, characters, game structures and similar are stored. Optionally, objects can be saved as drawings, commands or as a stream, for example for achieving an enhanced degree of data compression when stored in the data memory 280. Separation of the different elements, as aforementioned, enables user and developers to select which parts of the gameplay experience are to be watched and/or shared. In FIG. 4, there is illustrated an example of different elements as appreciated by the user when playing the game on the device 200. A first element 400 presented corresponds to a tool bar providing the user with various options when playing the game. In a window 410 of the display, gameplay actions are presented to the user, for example a first object 420 and a second object 430 which mutually interact in a games action space coinciding with the window 410. There is also provided a statistics window 440 in which various statistical information is presented, for example scores. Term stream can refer, but is not limited, to streaming of video, audio or it can also refer to any data which is stored/sent/recorded in certain order. For example game score as function of time can be regarded as stream or for example game events as they take place can be regarded as a stream.

Sharing gameplay experiences will now be described in further detail with reference to FIG. 5.

Figure 5:
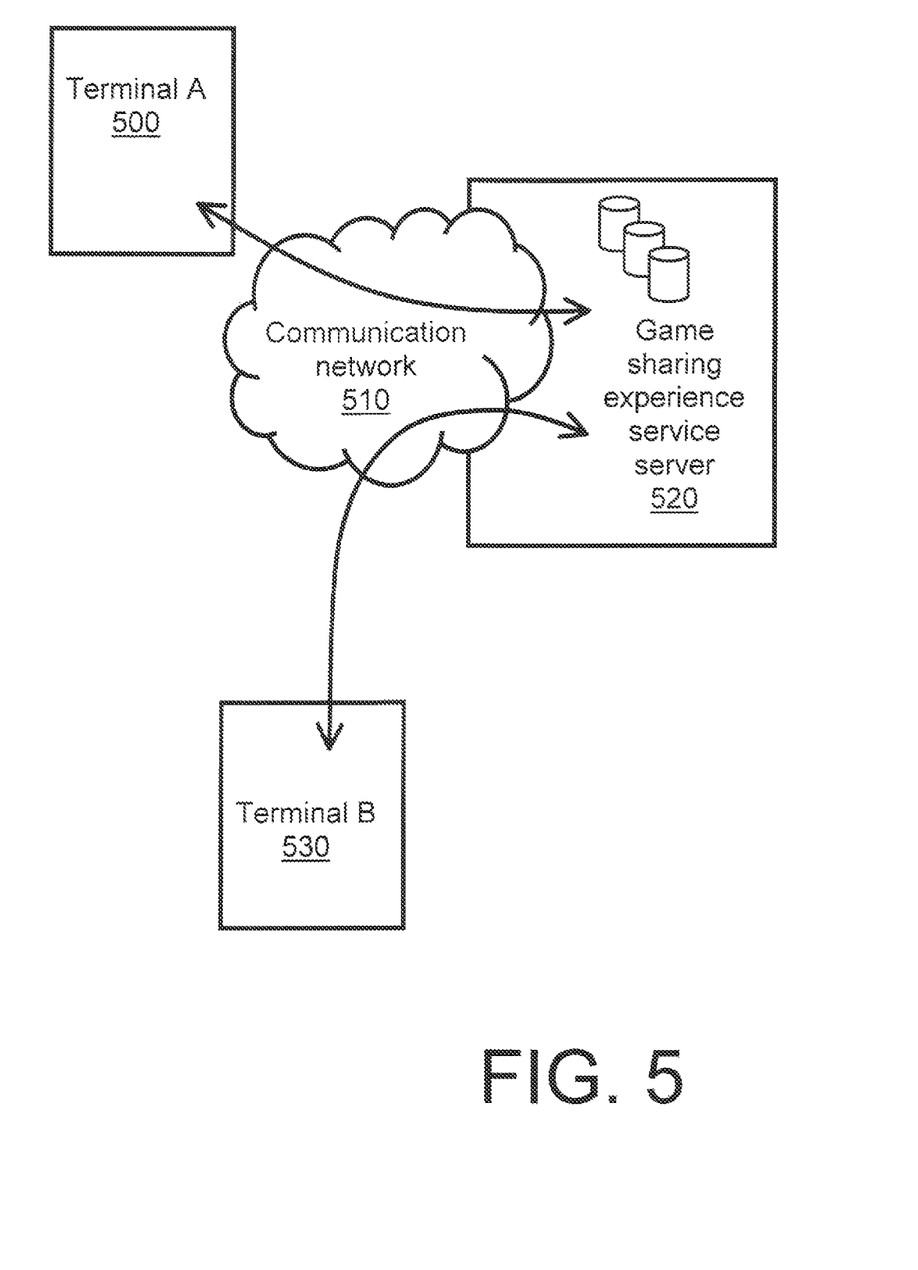
FIG. 5 is an illustration of a system for sharing gameplay experiences pursuant to the present invention.

Referring next to FIG. 5, a gameplay terminal A, denoted by 500, for example implemented using the aforementioned device 200, is configured to send all or some of the content via a communication network 510, for example a wireless communication network, of a game recorded in data memory 280 of the terminal A 500 to a game experience sharing service 520; the service 520 is implemented with its one or more data servers at a single location, at multiple locations or implemented via a cloud computing environment. Optionally, the recording of the game is stored in the one or more data servers of the game experience sharing service 520. The recorded game is beneficially streamed or downloaded from the game experience sharing service 520 to one or more spectator users B, denoted by 530. Users B might have same game as the user of terminal A or they might have different game/software for receiving/viewing game experience of user of the terminal A. In addition the game experience can be viewed with standalone application purposed for game experience viewing. Alternatively game experience could be viewed using web browser (for example using Hyper Text Markup Language 5 or some scripting language).

The recorded experience uploaded from the gameplay terminal A 500 can be streamed or downloaded to the one or more spectator users B 530, wherein the video is transcoded at various bitrates to suit different communication streaming rates pertaining to the one or more spectator users B 530, for example of the spectator users B 530 may have high-speed optical fibre communication links whereas other of the spectator users B 530 may be employing 3G mobile communication standards or even older standards which can only support relatively lower bitrates. Optionally, streaming of the recorded game video may occur from the game sharing service to the one or more spectator users B 530 in a peer-to-peer manner, thereby reducing streaming demands on the one or more data servers of the game experience sharing service 520. Optionally, the one or more spectator users B 530 are individuals with their own devices 200 which are also capable of uploading gameplay experiences to the game experience sharing service 520 in a manner as described in foregoing. Thus, optionally, the one or more users B 530 have at least one game installed in their game terminals, namely devices 200, which also includes aforementioned GESW API components. Said game used by user B does not have to be same (but can be) as in the terminal A i.e. game sharing experience works across the games and applications. As an example a player, with a game X1 that includes GESW API components, can share gaming experience, not only to users who are using the game of X1, but also to all other games and/or applications (such as X2, X3, Z1, ...) that have GESW API and vice versa. Embodiments thus enable to create a network of different games and applications that use the embedded SDK components (GESW API etc) that provides users an ability to share and watch replays from all of the games.

Figure 6:
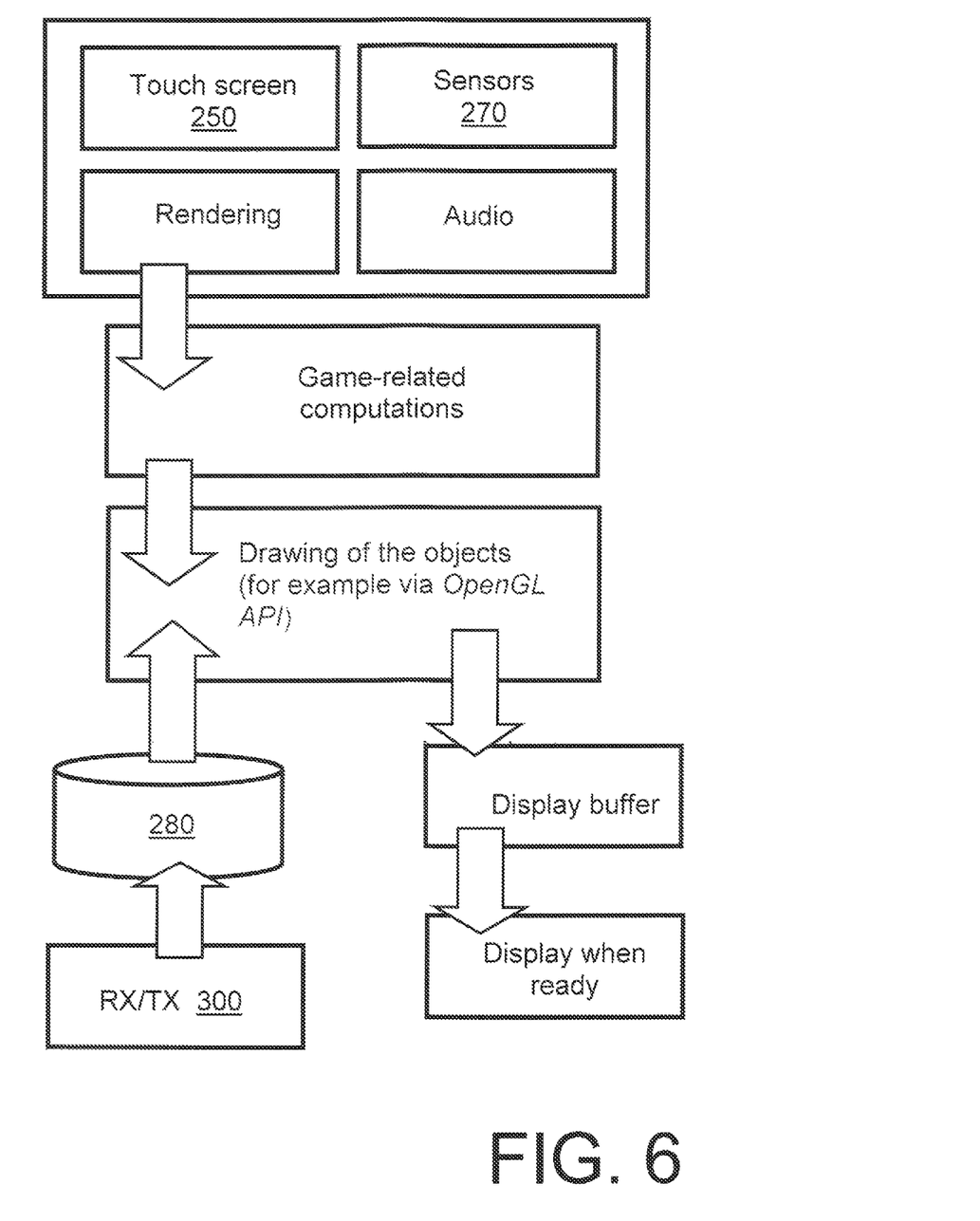
FIG. 6 is an example of steps of a process for sharing gameplay experiences pursuant to the present invention.

In FIG. 6, there is illustrated an example process for replaying recorded game playing experiences, namely "gameplay experiences", as downloaded from the game experience sharing service 520 for a given user B 530. The device 200 of the given user 530 connects via its wireless interface (RX/TX) 300 to the gameplay experience sharing service 520 for receiving a streamed gameplay experience which is then stored in the data memory 280 of the device 200 of the given user 530; the streamed gameplay experience can be recorded some time ago at the gameplay experience sharing service 520, for example a few days prior, or can be streamed in a substantially real-time from the gameplay experience sharing service 520. Once the gameplay experienced is buffered in the data memory 280 of the device 200 of the given user 530, the GESW API uses content from the data memory 280 to presenting the gameplay experience to the given user 530. For example, an OpenGL drawing module present in the device 200 of the given user 530 can be used to recreate the images for the video. Optionally, in the device 200 of the given user 530, a whole screen area of the display 230 of the device 200 is utilized for presenting the video of the gameplay experience to the given user 530; alternatively, only a portion of the display 230 of the device 200 is utilized for presenting the video of the gameplay experience, thereby allowing other elements to be presented concurrently to the given user 530 via the display 230; optionally, the other elements are user-configurable.

Figure 7:
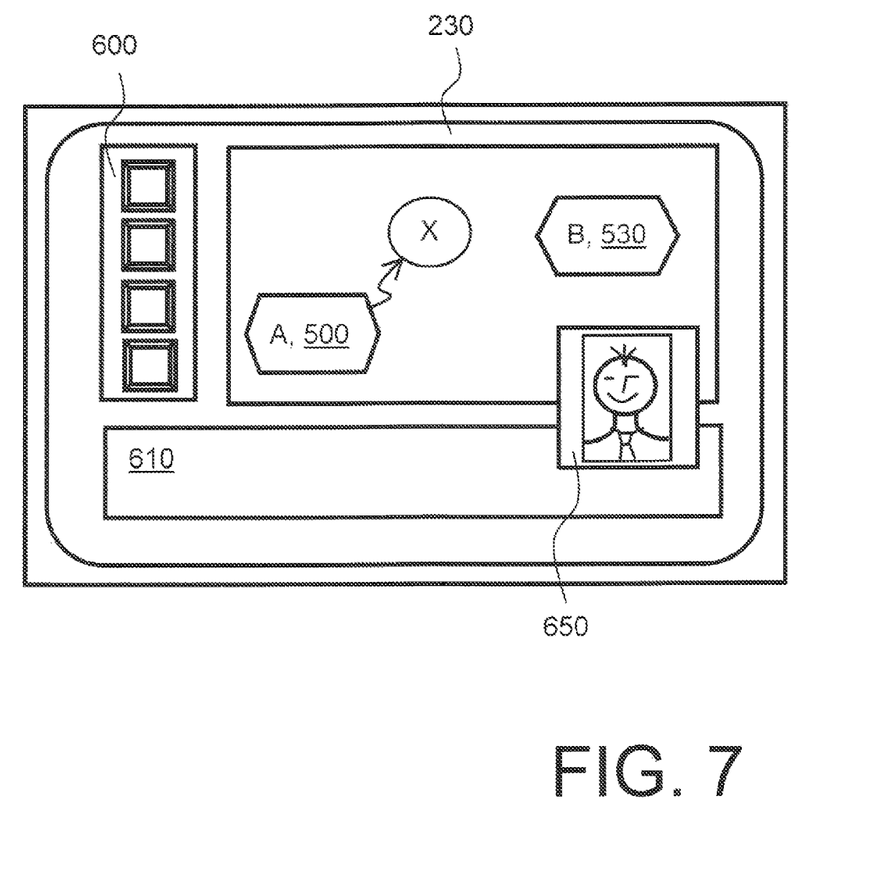
FIG. 7 is an example of a screen presentation provided to users when replaying gameplay experiences generated within the system of FIG. 5.

Optionally, the aforesaid GESW API library includes components for receiving, fetching, playing and recording game playing experiences from other users. For example, the given user B 530 is able to employ the GESW software to configure to have shown at a top of his/her display 230 a UserFace Video of the user A 500; please refer to aforementioned Table 1 for further elucidation of "UserFace Video". Similarly, in a reciprocal manner, the user A 500 is able to configure his/her device 200 to show an image of the user B 530 on a portion of the display 230 of the device 200 of the user A 500. Moreover, when the gameplay experience is being replayed, it is feasible to include all or some of the recorded components of the video as provided in Table 1; for example, as illustrated in FIG. 7, there is shown a representation of the display 230 of a device 200, wherein a tool bar window 600 is included on a left-side of the display 230, statistical information window 610 is included along a bottom region of the display 230, and a game-playing region is denoted by 620 wherein game-playing actions occur, for example between first and second objects denoted by 630, 630 respectively. The given user of the device 200 can employ user-selectable toggle options presented in the tool bar window 600 for defining a face video view of the gamer denoted by 650 to be partially overlaid onto the game playing region 620. Optionally, the GESW API presents the user with a timeline on the display 230 of a given game playing experience downloaded from the gameplay experience sharing service 520, so that the user is able to edit the gameplay experience via the display, for example by finger swiping motion applied to a touch screen sensor of the display 230 to achieve a preferred form of viewed gameplay experience.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

We claim:

1. A system for sharing gameplay experiences between users, wherein the system includes gameplay terminals which the users employ for gameplay activities, wherein the gameplay terminals include computing hardware for executing one or more software products recorded on non-transitory machine-readable data storage media, wherein the one or more software products include a host game software application for implementing one or more games on one or more of the terminals, and one or more software components for appending to the host game software application for providing control of the host game software application on a real-time basis for recording gameplay experiences for sharing amongst the users based upon one or more of: a game view, a sub-game view, sensor data employed to control the game, video camera views of one or more users playing the game, or game events occurring during playing the game; and wherein the computing hardware of the gameplay terminal is, upon execution of the one or ore software products, configured to:
   identify one or more game elements generated during playing of the game to be recorded as mutually independent data streams, wherein an actual game view is recorded as a first game video stream and a toolbar view generated during the playing of the game is recorded as a second game video stream;

enable selection of individual ones of the one or more of the recorded mutually independent data streams to be watched or shared;

detect a selection of individual ones of the recorded mutually independent streams on a viewing gameplay terminal; and present the selected ones of the recorded mutually independent streams as separate windows on the viewing gameplay terminal, wherein the first video stream is presented in a first window and the second video stream is presented in a second window.

2. The system as claimed in claim 1, wherein the one or more software components are operable to cause the gameplay terminals to communicate the gameplay experiences via a communication network to a gameplay sharing experience service server arrangement through which the gameplay sharing experience is communicated from an originating gameplay terminal to one or more recipient gameplay terminals.

3. The system as claimed in claim 2, wherein the gameplay terminals are implemented as wireless-enabled computing devices including one or more of: smart telephones, laptop computer, personal computers, Pad computers, or dedicated game playing terminals.

4. The system as claimed in claim 1, wherein the one or more software components are implemented as a software development kit (SDK) which includes a library of the components.

5. The system as claimed in claim 1, wherein execution of the one or more software components by the computing hardware causes the computing hardware to record separate individual streams, wherein the separate individual streams consist of: UserFace Video, Game Video, Mix Sound, Game Sound, Game Control, Game Stat statistics, User Interface (UI) Data, or Game Events.

6. The system as claimed in claim 5, wherein the separate individual streams, when selected by the viewing terminal, are presented in separate windows.

7. The system as claimed in claim 1, wherein one or more software components are implemented as a downloadable application software library.

8. The system as claimed in claim 7, wherein one or more software components are implemented via an OpenGL API.

9. The system as claimed in claim 1, wherein the one or more software components are operable to enable the gameplay experience when replayed at one or more of the terminals to be user-configurable by selecting amongst one or more streams of recorded elements stored in data memory when the gameplay experience was recorded prior to distribution within the system.

10. A software development kit (SDK) recorded on non-transitory machine-readable data storage media, wherein the software development kit includes a library comprising one or more software components which are susceptible to being incorporated into host game software for implementing the system as claimed in claim 1.

11. A method of sharing gameplay experiences between users (500, 530) included in a system, wherein the users are arranged to employ gameplay terminals which including computing hardware for executing one or more software products recorded on non-transitory machine-readable data storage media, wherein the method includes:

including in the one or more software products a host game software application for implementing one or more games on one or more of the terminals;

appending one or more software components to the host game software application for providing control of the host game software application on a real-time basis for recording gameplay experiences for sharing amongst the users based upon one or more of: game view, sub-game view, sensor data employed to control the game, video camera views of one or more users playing the game, or game events occurring during playing the game; and wherein execution of the one or more software components on the computing hardware of the gameplay terminal, cause the computing hardware to:

identify one or more game elements generated during playing of the game to be recorded as mutually independent data streams, wherein an actual game view is recorded as a first video stream and a toolbar view generated during the playing of the game is recorded as a second game video stream;

enable selection of individual ones of the one or more of the recorded mutually independent data streams to be watched or shared;

detect a selection of individual ones of the recorded mutually independent data streams on a viewing gameplay terminal; and present the selected ones of the recorded mutually independent streams as separate windows on the viewing gameplay terminal, wherein the first video stream is presented in a first window and the second video stream is presented in a second window.

12. The method as claimed in claim 10, wherein the method includes arranging for the one or more software components to be operable to cause the gameplay terminals to communicate the gameplay experiences via a communication network to a game sharing experience service server arrangement through which the game sharing experience is communicated from an originating gameplay terminal to one or more recipient gameplay terminals.

13. The method as claimed in claim 12, wherein the gameplay terminals are implemented as wireless-enabled computing devices including one or more of: smart telephones, laptop computer, personal computers, Pad computers, or dedicated game playing terminals.

14. The method as claimed in claim 11, wherein the one or more software components are implemented as a software development kit (SDK) which includes a library of the components.

15. The method as claimed in claim 11, wherein execution of the one or more software components by the computing hardware is configured to cause the computing hardware to record separate individual data streams, wherein the separate individual data streams consist of of: UserFace Video, Game Video, Mix Sound, Game Sound, Game Control, Game Stat statistics, User Interface (UI) Data, or Game Events.

16. The method as recited in claim 15, wherein the separate individual streams, when selected by the viewing terminal, are presented in separate windows.

17. The method as claimed in claim 11, wherein one or more software components are implemented as a downloadable application software library.

18. The method as claimed in claim 17, wherein one or more software components are implemented via an OpenGL API.

19. The method as claimed in claim 11, wherein the one or more software components are operable to enable the gameplay experience when replayed at one or more of the terminals to be user-configurable by selecting amongst one or more streams of recorded elements stored in data memory when the gameplay experience was recorded prior to distribution within the system.

20. A software product (GESW) recorded on non-transitory machine-readable data storage media, wherein the software product is executable upon computing hardware for implementing the method as claimed in claim 11.

* * * * *